Apr. 10, 1923. 1,451,541
L. T. FREDERICK
METHOD OF AND APPARATUS FOR MAKING PROPELLERS
Filed May 15, 1919
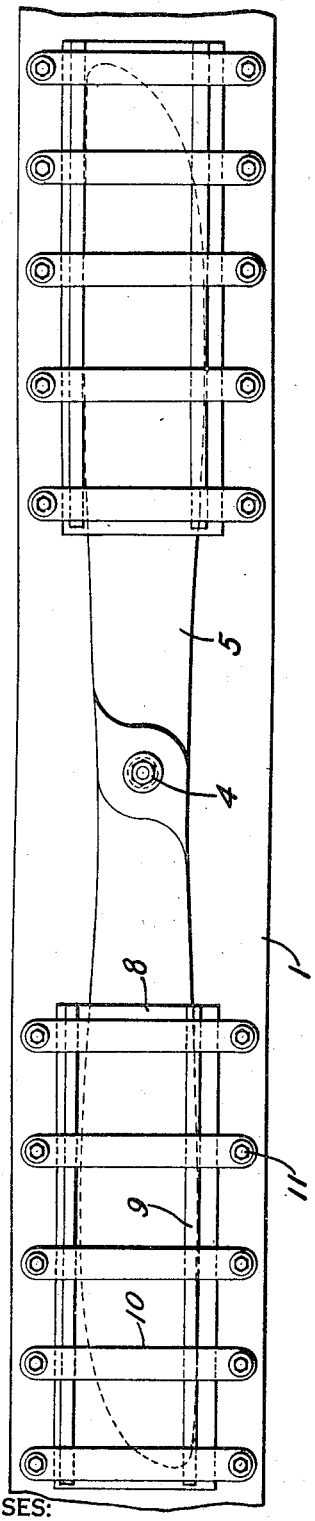
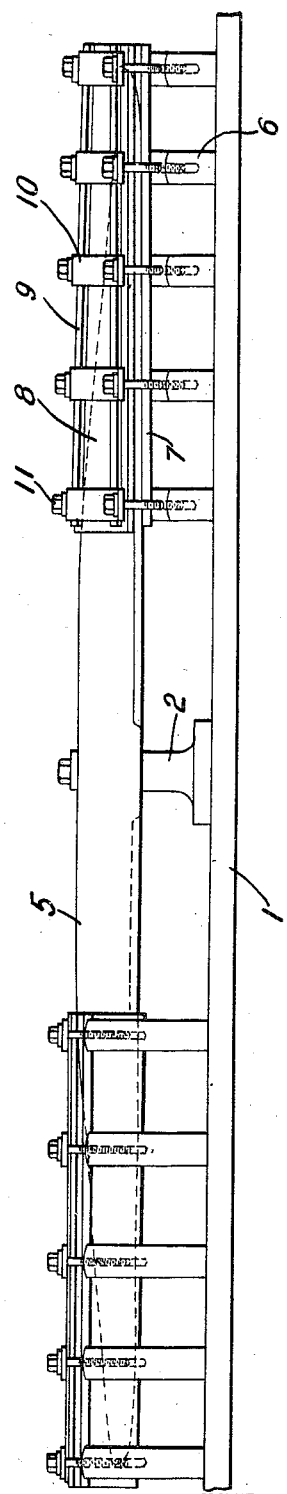
WITNESSES:
H. J. Shelhamer
W. H. Woodman.
INVENTOR
Louis T. Frederick
BY
Wesley G. Carr
ATTORNEY Patented Apr. 10, 1923.

1,451,541

UNITED STATES PATENT OFFICE.

LOUIS T. FREDERICK, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF AND APPARATUS FOR MAKING PROPELLERS.

Application filed May 15, 1919. Serial No. 297,352.

*To all whom it may concern:*

Be it known that I, LOUIS T. FREDERICK, a citizen of the United States, and a resident of Wilkinsburg, in the county of Allegheny and State of Pennsylvania, have invented a new and useful Improvement in Methods of and Apparatus for Making Propellers, of which the following is a specification.

My invention relates to a method of and apparatus for making propellers and more particularly to the molding and curing of propellers formed of fibrous material and a binder, such as a phenolic condensation product.

In a copending application filed by me December 30, 1918, Serial No. 268,954, and in a copending application filed by D. A. Dickey, December 30, 1918, Serial No. 268,949, and assigned to the Westinghouse Electric and Manufacturing Co., are disclosed propellers formed of superimposed sheets of fibrous material, such as paper, duck and the like, impregnated with a binder, such as a phenolic condensation product which is hardened by the application of heat and pressure. These applications also disclose the curing of propellers of this character in a mold in which they are subjected to the simultaneous action of heat and pressure until the binder has been transformed to its final, solid and substantially infusible and insoluble state.

I have found, however, that, while reasonable satisfaction is obtained by following the methods set forth in these applications, it is very difficult to obtain absolute accuracy of the blade angles so that all propellers cured in a single mold may not be identical and, in some instances, the angle of one blade may vary slightly from that of the other.

Furthermore, it is sometimes desirable to mold propellers in which the blade angles of one will vary slightly from those of another and, with a single mold, this is impossible when the propellers are cured in the manner disclosed in the above-referred-to applications.

In view of these facts, one of the primary objects of my present invention resides in providing a method of curing propellers such as to insure absolute uniformity of the blade angles and such that, if desired, the blade angles of various propellers may be slightly varied at will.

A still further object of my invention resides in the provision of an apparatus for practising my invention which shall be economical and simple in construction and convenient in use.

With these and other objects in view, my invention will be more fully described, illustrated in the drawings, in the several views of which corresponding numerals indicate like parts, and then particularly pointed out in the claims.

Fig. 1 is a plan view of an apparatus suitable for practising my invention, showing a propeller in place, and Fig. 2 is a side elevation of the structure shown in Fig. 1.

I have found that, if a propeller body formed of superimposed layers of fibrous sheet material and a binder which hardens under the application of heat and pressure, such as a phenolic condensation product, is subjected to heat and pressure in a mold, in the manner disclosed in the previously-referred-to applications, for a relatively short time, the binder will be nearly, but not entirely, hardened, the outer portion of the body being fully hardened and the inner portion being only partly cured. If the propeller is then removed from the mold and clamped in such manner as to bring the thrust faces of its blades at the proper angles and is then baked for a relatively long period of time, until the curing is completed, the blades will become permanently set at the exact angles at which they were clamped.

My present invention resides in the discovery of this process and in the provision of a suitable apparatus for carrying it out.

In the drawings, I have illustrated one form of apparatus suitable for the purpose which may comprise a base 1, of any suitable material, preferably metal, provided centrally with an up-standing post 2 adapted to snugly receive the hub 4 of a partially-cured propeller 5, of the character previously specified. The space at each side of the center post is provided with spaced supporting brackets 6, the upper faces of which are preferably inclined at the angles desired for the propeller blades, it, of course, being understood that the inclination of the upper faces of the brackets at one side is the reverse of the inclination of the upper faces of the brackets at the other side.

Clamp plates 7 are supported upon the inclined faces of the brackets to receive the thrust faces of the propeller blades, as clearly indicated in the drawings, and additional clamp plates 8 are disposed upon the back faces of the propeller blades, being preferably curved to roughly correspond to the curvature of the blades.

Brace strips 9 of metal may be positioned upon, or secured to, the edge portions of the upper clamping plates 8, and clamping bands 10 are disposed transversely of the upper clamping plates. Bolts 11 are extended through openings formed in the clamping bands and are screwed into the brackets to draw the thrust faces of the blades into position against the lower clamp plates.

In practising my invention with the above-described apparatus, I may assemble a propeller body as set forth in either of the applications referred to and partly cure it, at a relatively high temperature, in a mold, under pressure. A temperature of approximately 180° C. may be satisfactorily employed during the molding operation and the molding may be continued from two to four hours, more or less, dependent upon the materials employed and the size of the propeller. The propeller, in its nearly but not completely cured state, may then be removed from the mold and clamped in position upon the "reforming mold" or support above described, as clearly shown in Figs. 1 and 2 of the drawings. When so clamped, the curing of the propeller may be completed by baking it at a relatively low temperature of from 100 to 125° C. for a suitable length of time, as from four to twelve hours. This baking may be done in any form of oven suitable for the purpose and may be continued for a time varying in accordance with the size of the propeller.

A propeller thus "pre-cured" in a mold and subsequently baked will have its blades permanently set at the angles to which they are clamped so that absolute uniformity in blade angles is insured. Obviously, by interposing wedges or shims between the upper faces of the brackets and the lower clamping plate, the blade angles may be slightly altered, during baking, from the angles initially given them by the preliminary treatment in the mold.

Besides the advantages above referred to, the present method is preferable to the customary method of fully curing propellers in a mold in that it greatly shortens the length of time during which the relatively expensive mold and press are employed, thereby greatly reducing the cost of quantity production. The time required in the baking is not costly because no press is required, and the "reforming mold" or support is relatively inexpensive.

Obviously, various changes, both in the method of curing the propeller and in the apparatus employed in practising it, may be resorted to and I, therefore, reserve the right to make any changes in either which shall fall within the scope of the claims.

I claim as my invention:

1. The method of curing a propeller formed of fibrous sheet material and a binder which comprises subjecting the propeller to heat and pressure in a mold to partially cure and harden the binder, clamping the propeller with the thrust faces of its blades at the desired angles and baking the propellers to complete the curing and hardening of the binder.

2. The method of curing a propeller formed of fibrous sheet material and a phenolic condensation product as a binder which comprises partly curing the propeller by subjecting it to relatively high heat and pressure in a mold, removing the propeller from the mold, clamping the propeller to a support with its thrust faces held at the desired angles, and baking the propeller at a relatively low temperature until the binder is completely hardened.

3. An apparatus for use in curing propellers comprising a base, hub-engaging means carried thereby, supporting elements having portions inclined at the desired angles for the thrust faces of the blades, and means for clamping the blades against such portions.

4. An apparatus for use in curing propellers which comprises supports for the propeller blades disposed at the desired angles to receive the thrust faces of the blades, means for clamping the blades against the supports, and hub-engaging means for securing the hub in proper relation to the blades.

5. An apparatus for use in molding propellers which comprises a base, a hub-engaging means carried thereby, supports carried by the base and having inclined portions to receive the thrust faces of propeller blades, clamping plates for engagement against the thrust and back faces of the blades against the supports and between the clamping plates.

In testimony whereof, I have hereunto subscribed my name this 30th day of April, 1919.

LOUIS T. FREDERICK.